March 24, 1970     R. WECHSLER     3,502,943
TIMING CIRCUITRY FOR A FLASH CAMERA
Filed April 1, 1968

INVENTOR.
Reuben Wechsler
BY Mueller, Aichele & Rauner
ATTY'S.

United States Patent Office 3,502,943
Patented Mar. 24, 1970

3,502,943
TIMING CIRCUITRY FOR A FLASH CAMERA
Reuben Wechsler, Phoenix, Ariz., assignor to Motorola, Inc., Franklin Park, Ill., a corporation of Illinois
Filed Apr. 1, 1968, Ser. No. 717,674
Int. Cl. H05b 37/02, 39/04, 41/14
U.S. Cl. 315—238                                13 Claims

ABSTRACT OF THE DISCLOSURE

Timing circuitry for a flash camera which includes a current limiting impedance connected in series with a flashtube. The circuitry controls the amount of impedance in series with the flashtube to thereby control the light output of the flashtube in accordance with the distance between the flash camera and subject.

Background of the invention

This invention relates generally to light output control circuitry for flash cameras and more particularly to circuitry which is operative to control the energizing current through the camera flashtube.

In the art of photography and particularly electronic flash camera circuitry used to fire the flashtube of a camera, it is known to connect a storage capacitor in parallel with the flashtube and use this capacitor as a means for firing the flashtube. A common prior art circuit for performing this function includes a battery which is connected to charge up the storage capacitor to a firing voltage and a means for switching the storage capacitor in parallel with the flashtube to discharge the capacitor through the flashtube when a picture is taken.

One disadvantage of the above-described prior art circuit is that the circuit includes no means to control the amount of capacitor discharge current through the flashtube as a function of flashtube series resistance in order to control the light output of the flashtube. There may be some small amount of fixed circuit resistance in series with the flashtube which inherently limits the capacitor discharge current through the flashtube. However, prior to the present invention, there was no teaching known to the applicant that the light output of the flashtube could be controlled as a function of resistance by varying the resistance in series with the flashtube to control the capacitor discharge current therethrough. Now that the light output of the flashtube can be varied as a function of resistance and of time in accordance with the present invention, the light output of the flashtube can be controlled in accordance with the distance between the camera and subject. When the distance between camera and subject is at a maximum, it is preferred that little or no resistance be connected in series with the flashtube in order that the flashtube gives a maximum light output. On the other hand, when the distance between camera and subject is at a minimum, a maximum amount of resistance may be connected in series with the flashtube in order to limit the light output thereof to a desired minimum value.

Summary of the invention

An object of this invention is to provide new and improved resistance control circuits for a flash camera.

Another object of this invention is to provide a timing circuit for a flash camera which operates independently of the DC supply voltage for the camera and which consumes very little power.

Another object of this invention is to provide a timing circuit for a flash camera operative to control the flashtube light output as a function of time in accordance with the distance between camera and subject.

Another object of this invention is to provide a new and improved timing circuit for a flash camera which may be constructed using a minium number of electronic components and which may be fabricated in monolithic integrated form.

Another object of this invention is to provide a novel method for operating known flash camera circuitry in order to control the light output of the camera in accordance with the distance between camera and subject.

Briefly described, one embodiment of this invention includes a flash camera circuit in which a flashtube and a current limiting variable impedance are connected in series across a capacitor. The variable impedance may be a potentiometer such as a cermet pot which is adjustable in accordance with the distance betwen the flash camera and subject. In this manner, the discharge current into the flashtube is controlled to produce a desired light output from the flashtube corresponding to preselected distance between camera and subject.

In another embodiment of the invention, additional circuitry is provided and is connected in parallel with the current limiting impedance for the flashtube. This additional circuitry responds to the voltage developed across the current limiting impedance to short out the impedance at a predetermined time after current begins to flow therein. When using this additional circuitry, the current limiting impedance does not have to be variable since the impedance in series with the flashtube is controlled by voltage responsive circuitry as a function of time.

In the drawings

Description of the invention

Figure 1:
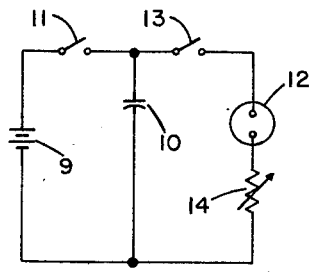
FIG. 1 is a circuit schematic illustrating one embodiment of this invention.

Referring to the drawings, there is shown in FIG. 1 a flashtube 12 connected in series with a current limiting impedance such as a variable resistor 14 across an energy storage capacitor 10 and a power supply 9. The power supply 9 serves to charge up capacitor 10 when the switch 11 is closed and capacitor 10 will charge up to a predetermined voltage which is sufficiently high to provide the desired maximum light output from the flashtube 12. For the sake of simplicity, the schematic diagrams show a switch 13 for connecting the energy storage capacitor 10 across the flashtube 12 to fire the latter. In most practical circuits, however, the flashtube 12 is connected across the energy storage capacitor 10 at all times, and the firing of the flashtube 12 is initiated by applying a high voltage pulse to the envelope of the flashtube 12. In known prior art circuits, the flashtube 12 is either connected directly across the capacitor 10 as the only component in the discharge path thereof or is connected in series with some fixed resistance which limits the discharge current through the flashtube 12.

In accordance with the present invention, a variable impedance such as resistor 14 is connected in series with the flashtube 12, and the resistance value of resistor 12 controlled in accordance with the distance between camera and subject. For example, the variable resistor 14 may be a potentiometer which is mechanically coupled to the range finder on the camera, so that the resistance in series with the flashtube 12 may be set for a particular setting on the range finder.

Figure 2:
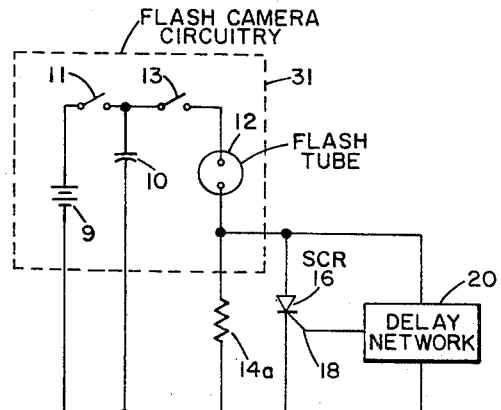
FIG. 2 illustrates another embodiment of this invention shown partly in schematic and partly in block diagram form.

In accordance with another embodiment of the present invention which is illustrated in FIG. 2, a triggerable switch 16 such as a semiconductor-controlled rectifier (SCR) is connected in parallel with resistor 14a, and a voltage responsive time delay network 20 fires the SCR 16 to shunt the series resistor 14a in accordance with the desired light output from the flashtube 12. The SCR 16, which is connected directly in parallel with the series resistor 14a, has a control electrode 18 thereof which is connected to the time delay network 20. The time delay network 20 responds to the voltage across resistor 14a and provides a firing voltage at the control electrode 18 of the SCR 16 a preselected time after current begins to flow through the flashtube 12. When the SCR 16 fires, the resistor 14a is shorted out and substantially all resistance in series with flashtube 12 is removed. Thus, when the distance between the flash camera and subject is at some preselected maximum value, the time delay of network 20 can be adjusted so that the SCR 16 will fire at a preselected minimum voltage across resistor 14 and short out all resistance in series with flashtube 12 immediately after tube 12 fires. On the other hand, when the distance between flash camera and subject is at some minimum value, the time delay of network 20 can be adjusted so that the firing voltage at gate electrode 18 is not reached until some maximum time interval after current begins to flow in the flashtube. It is to be understood, however, that the delay network 20 can be responsive to other and independent timing means within the scope of this invention. For example, network 20 could be completely disconnected from resistor 14 and, in turn, connected to a separate timing mechanism (not shown). The network 20 would then respond to such mechanism and fire to short out resistor 14a a predetermined time after current begins to flow through flashtube 12.

Figure 3:
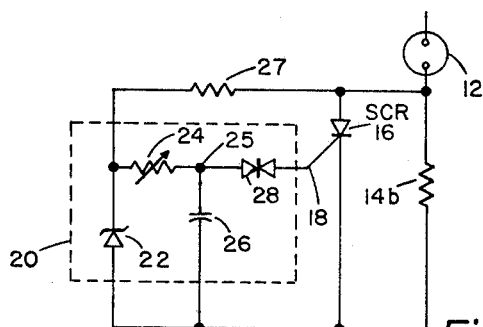
FIG. 3 is the same embodiment of the invention shown in FIG. 2, but illustrated entirely in schematic diagram.

In a specific embodiment of the invention illustrated in FIG. 3, the delay network 20 is responsive to the voltage developed across series resistor 14 to produce a firing voltage at the gate electrode 18 of the SCR 16. The delay network 20 includes a Zener diode 22, a charging resistor 24, an energy storage capacitor 26, and a trigger diode 28. The delay network 20 is connected through a current limiting resistor 27 to the anode of the SCR 16 and responds to a voltage across the series resistor 14 to fire the SCR 16 a preselected time after current begins to flow through flashtube 12.

When current begins to flow through flashtube 12 and the series resistor 14, the Zener diode 22 will immediately clamp the voltage at the midpoint of resistors 24 and 27 and capacitor 26 will begin to charge through charging resistor 24. The charging resistor 24 is variable and may be adjusted to a value consistent with the desired time at which capacitor 26 reaches a voltage sufficiently high to fire the trigger diode 28. The voltage clamping by Zener diode 22 makes it possible for the capacitor 26 to charge from a constant voltage source and, in the absence of the Zener diode 22, the capacitor 26 would charge from a variable voltage source, i.e., voltage across resistor 14. For some applications, as in the present invention where a high voltage trigger diode 28 is used, it is preferred that the energy storage capacitor 26 charge from a constant Zener voltage across diode 22. Yet in other applications using a low voltage trigger diode 28, it may be preferred to omit the Zener diode 22 and allow the energy storage capacitor 26 to charge from a time-varying voltage across resistor 14b.

When the capacitor 26 reaches the firing vlotage of the trigger diode 28, diode 28 conducts and fires the SCR 16. When SCR 16 fires, the series resistor 14b is effectively removed from the circuit and SCR 16 provides a substantially zero resistance path in series with flashtube 12.

Figure 4:
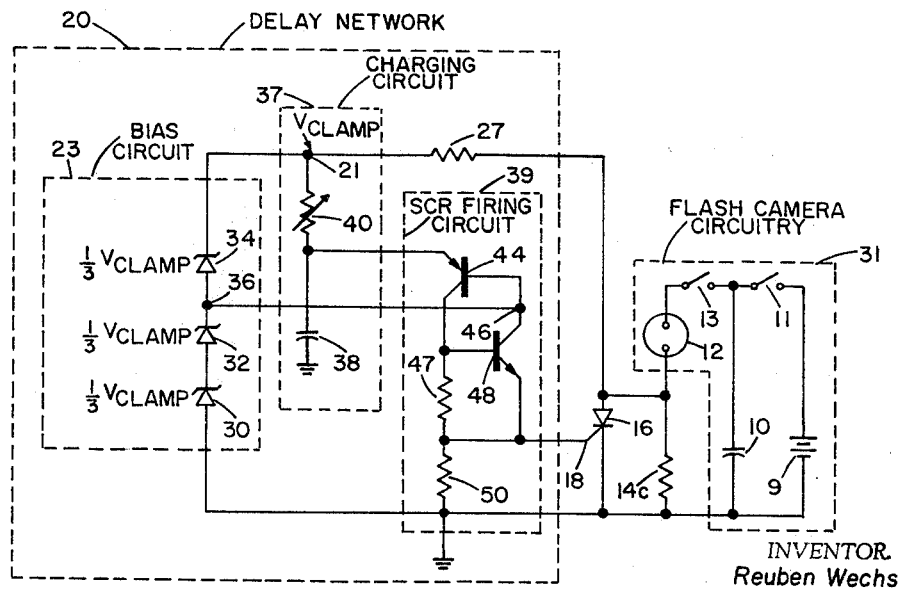
FIG. 4 is a schematic diagram of a different implementation of the invention embodied in FIG. 2 and which may be constructed in monolithic integrated form.

A different implementation of the invention embodied in FIG. 2 is illustrated in schematic diagram in FIG. 4 wherein like reference numerals have been used to identify like components of the various figures. The time delay network 20 in FIG. 4 includes a bias circuit 23, a charging circuit 37, and an SCR firing circuit 39. The triggerable switch (SCR) 16 is connected between the delay network 20 and the flash camera circuitry 31 in a manner similar to the connection shown in FIG. 2.

The bias circuit 23 includes three Zener diode clamps 30, 32, and 34 which are connected through the current limiting resistor 27 to the flashtube 12. A charging circuit 37, including energy storage capacitor 38 and resistor 40, is connected between Zener diode 34 and reference or ground potential, and charging circuit 37 is directly connected to the SCR firing circuit 29. The SCR firing circuit 39 includes regeneratively coupled transistors 44 and 48 and resistors 47 and 50.

The delay network 20 in FIG. 4 functions to fire the SCR 16 at a precisely adjustable time after current begins to flow through the flashtube 12 and resistor 14. The timing for firing the SCR 16 begins with the initial current flow through resistor 14 which develops a voltage across resistor 14 which is much in excess of the clamping voltage $V_{CLAMP}$ at point 21. This voltage $V_{CLAMP}$ biases the Zener diodes 30, 32, and 34 into conduction to clamp point 21 at approximately 21 volts or three times the Zener voltage, i.e., seven volts, of a single Zener diode. This clamping of the voltage at point 21 insures that the charging circuit 37 will be charged by a constant voltage which is independent of variations in current through the flashtube 12. An intermediate point 36 between Zener diodes 32 and 34 is connected to the base of transistor 44 so that the base voltage of transistor 44 is clamped to approximately 14 volts or ⅔ $V_{CLAMP}$. The latter connection insures that transistor 44 will fire when the emitter voltage thereof, i.e., the voltage across capacitor 38, reaches 14 volts plus the $V_{BE}$ offset voltage of transistor 44. $V_{BE}$ is typically in the order of .6 or .7 volt. Thus, the charging circuit 37 is always charged by a constant voltage appearing at point 21 and will always bias PNP transistor 44 conductive upon reaching a predetermined voltage at a predetermined time after capacitor 38 begins charging.

When the emitter of transistor 44 reaches 14 volts plus the $V_{BE}$ voltage of transistor 44, transistor 44 conducts and, by regenerative action, rapidly turns on transistor 48. Current from transistor 48 develops a voltage across resistor 50 sufficient in magnitude to fire the triggerable switch (SCR) 16. The connection of transistors 44 and 48 as shown in FIG. 4 insures rapid regenerative turn-on drive at the control electrode 18 of the SCR 16. Resistor 47, which is connected between the base and emitter electrodes of transistor 48, is optional and may be eliminated if desired. This resistor 47 reduces the low current gain of transistor 48 and prevents firing of transistor 48 on leakage current.

Since the time constant of any RC circuit is the time required for a capacitor to charge up to approximately 63% of the charging voltage, then the time constant of the RC network consisting of capacitor 38 and resistor 40 is that time required for the capacitor 38 to charge up to 63% of approximately 21 volts. This voltage will be slightly less than the 14 volts plus one $V_{BE}$ required to bias transistor 44 into conduction. Thus, at some time which is slightly longer than the time constant of the charging circuit 37, the capacitor 38 will be charged to a value sufficient to bias the PNP transistor 44 into conduction, i.e., approximately 67% of 21 volts plus the $V_{BE}$ of transistor 44 or 14 volts plus one $V_{BE}$. This feature insures that the firing circuit 39 will always trigger on a relatively steep portion of the RC exponential charging characteristic of RC circuit 37, thus minimizing errors in timing due to voltage variations in the circuit.

The following table lists values of components used in a circuit of the type described with reference to FIG. 3.

However, said table should not be construed as limiting the scope of this invention.

TABLE

Component (value):
  Resistor (R)—
    R146—15 ohms
    R24—150,000 ohms
    R27—10,000 ohms
  Capacitor (C) 26—.1 microfarad
  Zener 26—27 volts
  Trigger diode 28—20-volt trigger The above-described invention is limited only by way of the following appended claims.

I claim:

1. Circuitry for controlling the light output of a flash camera including, in combination:
   an energy storage capacitor adapted to receive a charging current from a source of supply voltage for charging up to a predetermined voltage level,
   a flashtube connected to said capacitor for receiving energy therefrom to provide a desired maximum light output from the flashtube, and
   variable impedance means connected in series with said flashtube and in the discharge path of said capacitor for controlling the discharge current through said flashtube and thereby controlling the light output from said flashtube in accordance with a preselected distance between said flashtube and subject.

2. The circuitry defined in claim 1 wherein said variable impedance means is a variable resistor.

3. A timing circuit for a flash camera of the type having an energy storage capacitor connectable in parallel with a flashtube for providing a discharge current therethrough, said timing circuit including, in combination:
   a resistor connected in series with said flashtube for limiting the current flow therethrough,
   a triggerable switch connected to said resistor for varying the time during which said resistor remains in series with said flashtube, and
   a time delay network connected to said triggerable switch and responsive to the voltage across said resistor in series with the flashtube to fire said flashtube a predetermined time after current begins to flow in said flashtube.

4. The timing circuit defined in claim 3 wherein said time delay network is also connected to said resistor and fires said triggerable switch a predetermined time after current begins to flow in said resistor in series with said flashtube.

5. The timing circuit defined in claim 4 wherein:
   said triggerable switch is a semiconductor controlled rectifier, and
   said time delay network is connected to the gate electrode of said rectifier.

6. The timing circuit defined in claim 4 wherein said time delay network includes storage means for charging to a predetermined voltage a predetermined time after current begins to flow in said resistor to thereby provide a firing voltage at said triggerable switch which will bias said triggerable switch into conduction and control the light output of said flashtube by effectively removing said resistor previously in series with said flashtube.

7. The timing circuit defined in claim 6 wherein said triggerable switch is a semiconductor-controlled rectifier having a gate electrode coupled to said storage means and receiving therefrom a firing voltage when said storage means has charged to a predetermined voltage.

8. The timing circuit defined in claim 7 which further includes a trigger diode connected between said storage means and the gate electrode of said semiconductor-controlled rectifier, said trigger diode operative to conduct when said storage means charges up to a predetermined voltage to thereby in turn fire said semiconductor-controlled rectifier.

9. The timing circuit defined in claim 8 wherein:
   said storage means is a capacitor which is connected to a charging resistor and further coupled to said resistor in series with said flashtube, said last-named capacitor operative to charge toward the voltage developed across said resistor in series with said flashtube, and
   a clamp connected between said charging resistor and a point of reference potential for clamping the voltage toward which said last-named capacitor charges.

10. The timing circuit defined in claim 9 wherein:
    said clamp is a Zener diode connected between said charging resistor and said point of reference potential and operative to clamp the voltage at said charging resistor to the Zener voltage of said Zener diode, and
    a current limiting resistor connected between said Zener diode and said semiconductor-controlled rectifier for limiting the current flowing in said Zener diode and the charging current to said last-named capacitor.

11. In a timing circuit for a flash camera of the type having an energy storage capacitor connected in parallel with a flashtube for providing a discharge current therethrough for energizing said flashtube, the improvement comprising a variable impedance means connected in series with said flashtube and adjustable to a value consistent with the desired discharging current through said flashtube and the desired light output thereof.

12. Circuitry defined in claim 11 wherein said variable impedance means is a variable resistor.

13. A method for varying the light output of the flashtube of a flash camera which comprises the steps of:
    connecting a variable impedance in series with the flashtube to limit the discharge current therethrough, and
    adjusting the value of said impedance to limit said discharging current through the flashtube to a level which produces a preselected light output of the flashtube in accordance with the distance between flash camera and subject.

References Cited

UNITED STATES PATENTS 2,901,671  8/1959  Most _____ 315—219
3,122,677  2/1964  Flieder _____ 315—241

JOHN W. HUCKERT, Primary Examiner

R. F. POLISSACK, Assistant Examiner

U.S. Cl. X.R.

315—119, 125, 126, 241, 245